United States Patent [19]
Pierce

[11] Patent Number: 5,515,300
[45] Date of Patent: May 7, 1996

[54] COHERENT SIGNAL POWER DETECTOR USING HIGHER-ORDER STATISTICS

[75] Inventor: Robert D. Pierce, Sterling, Va.

[73] Assignee: The United States of America as represented by the Secretary of the Navy, Washington, D.C.

[21] Appl. No.: 129,500

[22] Filed: Sep. 30, 1993

[51] Int. Cl.$^6$ .......................... G01R 23/00; G01R 23/16
[52] U.S. Cl. ................. 364/572; 324/76.19; 324/76.21; 324/76.38
[58] Field of Search ..................................... 364/554, 574, 364/724.06, 522, 524; 342/192, 116, 160, 196; 375/55, 94; 324/76.19, 76.21, 76.38

[56] References Cited

U.S. PATENT DOCUMENTS

| | | | |
|---|---|---|---|
| 3,151,312 | 9/1964 | Beck | 364/554 X |
| 4,305,159 | 12/1981 | Stromswold et al. | 324/76.91 |
| 4,507,794 | 3/1985 | Jones et al. | 375/55 |
| 4,859,960 | 8/1989 | Stanford et al. | 329/126 |
| 5,162,723 | 11/1992 | Marzalek et al. | 324/76.19 |
| 5,165,051 | 11/1992 | Kumar | 364/724.06 |
| 5,227,801 | 7/1993 | Pierce | 342/192 |
| 5,231,403 | 7/1993 | Pierce | 342/92 |
| 5,293,114 | 3/1994 | McCormick et al. | 324/76.21 |
| 5,323,337 | 6/1994 | Wilson et al. | 364/574 |
| 5,379,770 | 1/1995 | Van Veen | 128/661.09 |

*Primary Examiner*—Edward R. Cosimano
*Attorney, Agent, or Firm*—Jacob Shuster

[57] ABSTRACT

A signal detection system divides a data sampling run into blocks and performs a fast Fourier transform on each block, sorting results by frequency. Combinations of results of the fast Fourier transform corresponding to each frequency are processed to derive a test statistic which is unbiased by Gaussian noise while including such combinations of results of the fast Fourier transform which would be redundant over other combinations. Information concerning the frequency behavior of the signal derived in the course of detection, is accomplished with increased sensitivity.

12 Claims, 8 Drawing Sheets

COHERENT SIGNAL POWER DETECTOR USING HIGHER-ORDER STATISTICS

STATEMENT OF GOVERNMENT INTEREST

The invention described herein may be manufactured and used by or for the Government of the United States of America for governmental purposes without the payment of any royalties thereon or therefor.

DESCRIPTION

BACKGROUND OF THE INVENTION

1. Field of the Invention

The present invention generally relates to the passive detection of signals which may be transmitted acoustically or electromagnetically to a detection location and, more particularly, to detection and spectrum analysis of signals in the presence of high levels of noise, such as may be encountered with hydrophones or in condition-based diagnostics of machinery as well as active detectors such as pulse Doppler radar.

2. Description of the Prior Art

Many arrangements for detection and enhancement of a signal in the presence of noise are well-known in the art; radio and television receivers being particularly familiar examples. Coherent radar is another application in which enhancement of a signal together with rejection of background noise and time-varying clutter is particularly critical. In all of these systems and others, however, some parameters of the signal to be detected, such as the carrier frequency of the signal of interest, are known.

When this is not the case, such as in condition-based diagnostics where slight changes in the noise output of a complex machine may include one or more frequency characteristics which are specific to a potential malfunction, and it is desired to detect a completely unknown acoustic or electromagnetic signal in the presence of noise, the classical technique has employed spectrum analysis. In this technique, discussed in detail in "The use of Fast Fourier Transform for the Estimation of Power Spectra: A Method Based on Time averaging over Short, Modified Periodograms" by P. D. Welsh, IEEE Transactions on Audio Electroacoustics, Vol. AU-15, pp. 70–73, June, 1967, which is hereby fully incorporated by reference, a tonal or sine-wave signal in a receiver output having low signal to noise ratio (SNR) is analyzed at varying resolutions (e.g., bandwidths) to look for peaks which increase as bandwidth is reduced (e.g. as resolution is increased). If a signal is present having a frequency falling within one of a plurality of overlapping bandwidths, decrease of bandwidth will reduce the relative signal power attributable to noise, leaving substantially only the signal power in the tonal.

This approach has three principal drawbacks, however. The methodology is inherently slow or hardware intensive since a reduction of bandwidth by any given factor increases the number of bands which must be processed by the same factor for any given resolution. Since the process is carried out sequentially at a plurality of resolutions, processing time or hardware (whether analog or digital) must be greatly multiplied as resolution increases. Further, since the signal of interest may vary in frequency due to modulation of frequency or Doppler effects (if either or both of the source or receiver are in motion), the signal power of the signal of interest may be distributed over several bands as resolution is increased. Additionally, to increase spectral resolution, known spectrum analysis techniques must increase the amount of data available which, in turn, increases processing time.

Higher-Order Statistics (HOS) methods have been recently employed in coherent radar systems for object profiling and velocity measurement. Specifically, U.S. Pat. Nos. 5,227,801, and 5,231,403, to Robert D. Pierce which are hereby fully incorporated by reference, describe particularly effective techniques of achieving these goals. Even more recently, a technique of detecting moving and even accelerating targets with coherent radar and HOS techniques has been described in U.S. patent application Ser. No. 08/127,619, filed Sep. 28, 1993 now U.S. Pat. No. 5,402,131 issued Mar. 28, 1995, (Navy case No. 75,280) by Robert D. Pierce, which is also fully incorporated herein by reference. HOS methods have several desirable characteristics of preserving phase information (e.g., coherency), are insensitive to linear phase shifts and suppress Gaussian noise effects.

While HOS methods are used to enhance signals in radar systems, some aspects of the signals to be detected are necessarily known, as pointed out above. To date, no system has significantly increased the noise rejection of the classical technique of signal detection, described above, for an unknown signal.

It is also generally recognized that a desired signal can often be detected under adverse conditions such as high noise levels if certain adaptations are made in the detector, based on the expected nature of the noise and/or the signal. However, just as small variations in the frequency of a signal can defeat or greatly reduce the effectiveness of known spectrum analysis-based detectors, a detector which is specifically adapted to certain signal characteristics is generally ineffective to detect signals having characteristics which are only slightly at variance therewith. Moreover, there is currently no consistent methodology or single apparatus capable of detecting a wider variety of signal variation than the spectrum analysis-based devices and methods described above which remains the methodology of choice where the characteristics of the signal to be detected are entirely unknown. Conversely, no technique has heretofore been developed to broaden the range of signal variation which will allow detection of a signal by a signal analyzer.

SUMMARY OF THE INVENTION

It is therefore an object of the present invention to provide a method and apparatus for increasing sensitivity and noise rejection in a signal power detector, such as a spectrum analyzer, or electromagnetic or acoustic receiver, such as a radio receiver or hydrophone system.

It is another object of the invention to provide a signal spectrum analyzer having high speed of operation and capable of tracking a signal which varies in frequency over time.

It is a further object of the invention to provide a signal enhancement method and apparatus which will provide rapid detection of an unknown signal.

It is yet another object of the invention to provide a signal analyzer capable of detection of an unknown signal having a wide variation in frequency.

It is another further object of the invention to provide a signal detector capable of providing information which characterizes the nature of frequency variation of the signal.

In order to accomplish these and other objects of the invention, a signal detection method is provided including a computation of a test statistic from combinations of values in a block of signal samples including the steps of dividing a run of sampled signals into blocks, performing a fast Fourier transform on each block and sorting results of the fast Fourier transform by frequency, eliminating combinations of the results which are redundant, excluding combinations of results in which noise present in samples would bias the test statistic from the list of said combinations of samples, and determining detection of a signal based on a test statistic computed only from remaining combinations of results.

In accordance with another aspect of the invention, an apparatus for detection of a signal in the presence of noise is provided comprising an arrangement for dividing a run of samples into blocks, a processor for performing a fast Fourier transform on each said block and sorting results of said fast Fourier transform by frequency, an index look-up table containing combinations of addresses for accessing combinations of transform results in which combinations of addresses which are redundant over other combinations of addresses in the index look-up table and combinations of addresses in which an addresses of a first pair of addresses was the same as one of the addresses of a second pair of addresses are excluded.

In accordance with a further aspect of the invention, a spectrum anaylzer is provided including apparatus for detection of a signal in the presence of noise is provided comprising an arrangement for dividing a run of samples into blocks, a processor for performing a fast Fourier transform on each said block and sorting results of said fast Fourier transform by frequency, an index look-up table containing combinations of addresses for accessing combinations of transform results in which combinations of addresses which are redundant over other combinations of addresses in the index look-up table and combinations of addresses in which an addresses of a first pair of addresses was the same as one of the addresses of a second pair of addresses are excluded.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
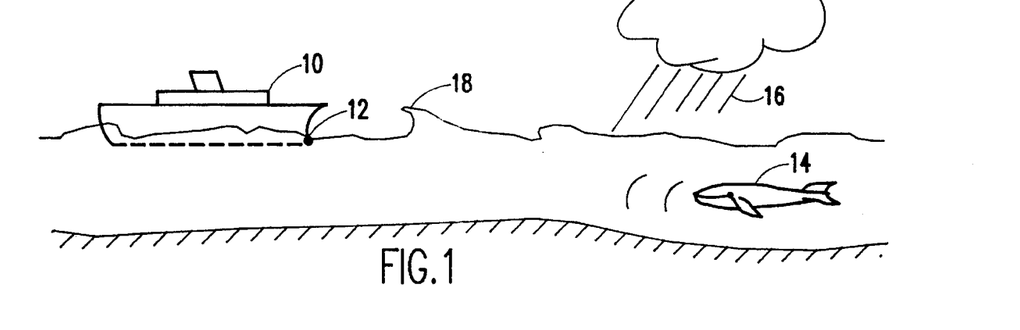
FIG. 1 shows an exemplary environment in which the invention may be employed.

Referring now to the drawings, and more particularly to FIG. 1, there is shown an exemplary environment in which the invention may be advantageously be employed. For example, as shown, a water-borne vessel 10 carries a hydrophone transducer 12 for receiving acoustic signals transmitted through the water. In this example, the signal of interest is a sound made by a whale 14 as the target which is well-known to usually include target identifying parameters such as a rising or falling frequency tone (a time-frequency representation). The frequency of this tone may however be modified by relative motion of the water-borne vessel 10 and the whale 14. Further in this noisy environment example, other background noises or signals derive from the noise of wind, rain 16 and breaking waves 18 as well as noise emanating from the hull and wake of the water-borne vessel and others. Each of these noise sources may have components having particular spectra such as white or pink noise or specific characteristic spectral components. Generally, however, signal sources of interest will have specific spectral components (e.g. periodic signals or tonals).

It is to be understood that while the major meritorious effect of the present invention is in the detection of signal about which nothing or very little is known and deriving such information in the course of detection, the invention is also applicable to non-passive systems such as sonar and radar and other active detection processing. Particularly in the latter case, the invention provides a technique of detecting and analyzing signals having characteristics which would otherwise defeat pulse Doppler radar or other detection systems.

In order to provide rejection of noise and signal enhancement, the invention provides a family of coherent signal detectors which are defined over even orders of products of signal samples. Odd order products can average to zero and their usefulness has not been fully evaluated. Further, the second order product is of very limited practical application since it does not provide detection for a varying frequency signal. The practical utility of eighth and higher order products has not been fully evaluated.

Therefore, the following discussion will first describe the definition of a second order detector in order to convey an understanding of the evaluation of samples in accordance with the principles of the invention. Then these principles will be extended to fourth order and sixth order detectors together with practical implementations thereof; from which examples, extension of the principles of the invention and suitable implementing structure to higher order products will be evident to those skilled in the art as well as implementing structure for the second-order detector.

In the preferred embodiment of the invention, a preprocessor is provided which takes a predetermined number (e.g., 32) blocks of samples, each containing a predetermined (e.g., 2048) samples. A fast Fourier transform (FFT) is performed on each block of samples and the results segregated into "bins" by frequency. Thus, each "bin" will contain a number of results equal to the number of blocks of samples corresponding to each of the blocks but at a single frequency. Since the data in each "bin" corresponds to a single frequency and the blocks of samples are separated in time, the contents of each bin are, in fact, time separated samples which are coherent in the sense of containing amplitude and phase information concerning any signal which may be present at that frequency. In contrast to classical spectrum analysis techniques which accumulate signal power, the present invention maintains the results of the FFT as discrete values which are sorted by frequency for further processing by HOS methods. If products of these discrete values or results are then averaged using HOS methods, any noise will average toward zero and any signal present will average toward a constant level, as is shown by the following analysis.

Figures 2A, 2B:
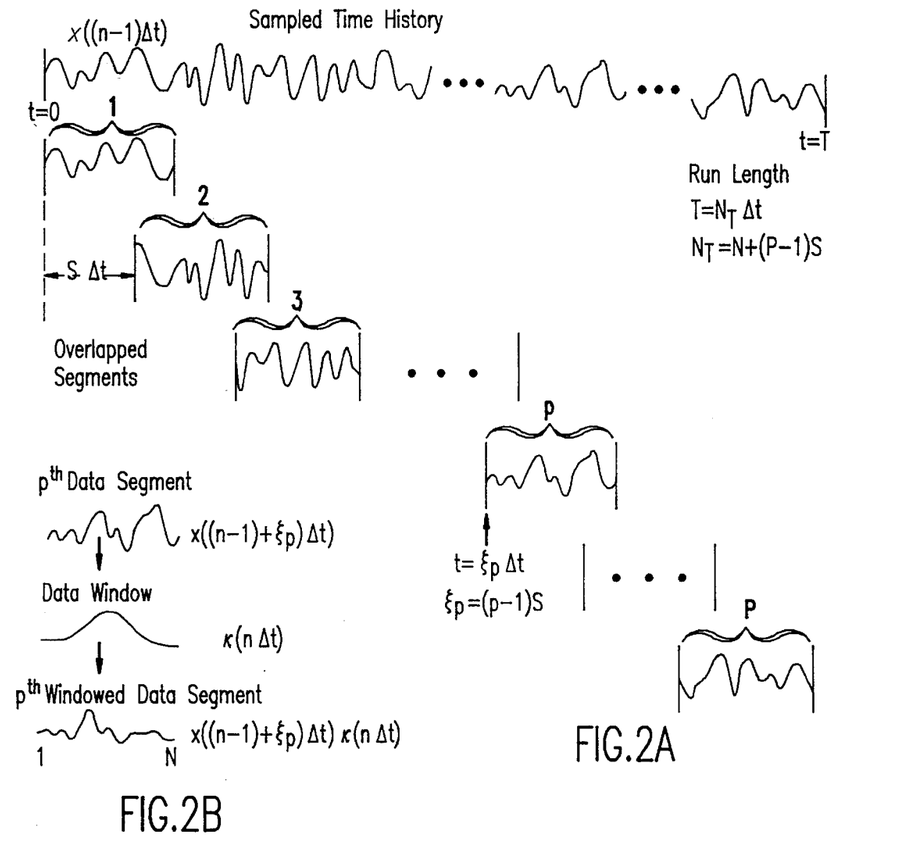
FIGS. 2A and 2B illustrate initial signal processing in accordance with the invention.

The development of a coherent signal power detector in accordance with the invention begins similarly to the classical spectrum analyzer given by Welch. As shown in FIG. 2A, a signal, possibly containing a large proportion of noise is sampled over time and stored. The sampled time history, $x((n-1)\Delta t)$, with run length, T, is broken into P overlapping segments of N samples each. The sample period is $\Delta T$ and the run length is $$T = N_T \Delta t \quad (1)$$

such that the total number of samples is $$N_T = N + (P-1)S \quad (2)$$

Each segment is shifted by S samples relative to the last segment, such that the pth segment is shifted by $$\xi_p = (p-1)S \quad (3)$$

samples. Each segment is then windowed and the Fast Fourier Transform (FFT) is taken of each segment as shown by the sequence of operations of FIG. 2B. Where the transform is sampled at each frequency, $\omega_j$, the result of the FFT operation can be expressed as $$X_p(\omega_j) = \frac{1}{N} \sum_{n=1}^{N} x((n-1+\xi_p)\Delta t)\kappa(n\Delta t) e^{-i\omega_j \Delta t(n-1)} \quad (4)$$

where $$\omega_j = (j-1)\frac{2}{N}\omega_0 \quad (5)$$

for positive frequencies $$1 \leq j \leq \frac{N}{2} + 1$$

such that $$\omega_0 = \frac{\pi}{\Delta t} \quad (6)$$

At this point, known spectrum analysis techniques average and accumulate the magnitude squared of the P transformed segments at each frequency. Auto spectrum estimates of the power spectrum are formed by the average $$\hat{G}_{xx}(\omega_j) = \frac{\Lambda_\kappa}{P} \sum_{p=1}^{P} X_p(\omega_j) X^*_p(\omega_j) \quad (7)$$

and the cross-spectrum estimate of the power spectrum is given by $$\hat{G}_{xy}(\omega_j) = \frac{\Lambda_\kappa}{P} \sum_{p=1}^{P} X_p(\omega_j) Y^*_p(\omega_j) \quad (8)$$

The factor, $\Lambda_K$, is an appropriate normalization constant that depends on spectral resolution and the shape of the data window applied to the overlapping samples. The choice of data window is believed to be of substantially the same significance and function as in known spectrum analysis techniques in the practice of the invention. The criteria on which the choice of data window may be based is essentially unchanged from currently known spectrum analysis techniques and therefore need not be further discussed. For simplicity in the following discussion, a rectangular data window will be assumed.

The signal of interest is assumed to be periodic but is permitted to change in frequency over time in a linear fashion. A linear change in frequency with time is often referred to in the art as a "chirp". This signal of interest is also assumed to exist in the presence of a significant amount of noise. Therefore, following the above analysis, the sampled time history is given by $$x(t_n) = A \sin(\omega_x t_n + v t_n^2 + \phi) + \eta(t_n) \quad (9)$$

where $$t_n = (n-1)\Delta t \quad (10)$$

In complex representation, Equation (9) may be expressed as $$x(t_n) = \frac{A}{2i} [e^{i(\omega_x t_n + v t_n^2 + \phi)} - e^{-i(\omega_x t_n + v t_n^2 + \phi)}] + \eta(t_n) \quad (11)$$

The FFT of the pth segment for positive frequencies is $$X_p(\omega_j) = \frac{A}{2iN} \sum_{n=1}^{N} \kappa(n\Delta t) e^{i[\omega_x(t_n + \xi_p \Delta t) + v(t_n + \xi_p \Delta t)^2 + \phi]} e^{-i\omega_j \Delta t(n-1)} + \Psi_p(\omega_j) \quad (12)$$

Where $\psi_p(\omega_j)$ in the transform of the noise segment.

If a rectangular data window is assumed, for simplicity, $$\kappa(n\Delta t) = 1, 1 \leq n \leq N \quad (13)$$

The blur term given by $e^{iv(\Delta t(n-1))^2}$ can be ignored if the frequency varies by less than one or two cells or bins during one data segment or block (e.g. 2048 samples). Then, $$X_p(\omega_j) = \frac{A}{2i} e^{i[\omega_x \xi_p \Delta t + v(\xi_p \Delta t)^2 + \phi]} e^{i\Xi_{jp} \frac{N-1}{2} \Delta t} \frac{\sin(\Xi_{jp} N\Delta t)}{N\sin(\Xi_{jp}\Delta t)} + \Psi_p(\omega_j) \quad (14)$$

where, to simplify the expression, $$\Xi_{jp} = \omega_x + 2v\xi_p \Delta t - \omega_j \quad (15)$$

The power spectrum is then $$G_{xx}(\omega_j) = E[\hat{G}_{xx}(\omega_j)] = \quad (16)$$

$$\Lambda_\kappa \left(\frac{A}{2}\right)^2 \left[\frac{1}{P} \sum_{p=1}^{P} \left(\frac{\sin(\Xi_{jp} N\Delta t)}{N\sin(\Xi_{jp}\Delta t)}\right)^2\right] + G_{\eta\eta}(\omega_j)$$

and the cross spectrum is $$G_{xy}(\omega_j) = E[G_{xy}(\omega_j)] = \quad (17)$$

$$\Lambda_\kappa e^{i(\phi_x - \phi_y)} \frac{AB}{4} \left[\frac{1}{P} \sum_{p=1}^{P} \left(\frac{\sin(\Xi_{jp} N\Delta t)}{N\sin(\Xi_{jp}\Delta t)}\right)^2\right] + G_{\eta_x \eta_y}(\omega_j)$$

where the last term of the equation corresponds to the noise which is correlated between two sensors. Therefore, the ability to estimate the phase difference between two channels, as is presented by the direction of arrival of a signal at a sensor array, is impaired by the presence of noise which is correlated between the two channels In accordance with the invention, a second order product of transformed samples and conjugates is given by $$X_a(\omega_j) X^*_b(\omega_j) = \left(\frac{A}{2}\right)^2 e^{i[\omega_x \Delta t(\xi_a - \xi_b) + v\Delta t^2(\xi_a^2 - \xi_b^2)]} e^{iv\Delta t^2(\xi_a - \xi_b)(N-1)} \frac{\sin(\Xi_{ja} N\Delta t)\sin(\Xi_{jb} N\Delta t)}{N\sin(\Xi_{ja}\Delta t) N\sin(\Xi_{jb}\Delta t)} + \Psi_a(\omega_j)\Psi^*_b(\omega_j) \quad (18)$$

where the cross terms between the sinusoid and noise (which will average to zero) are ignored to simplify the expression. For linear variation of frequency over time, this product is non-stationary and it therefore does not provide a useful result for detection. However, for constant frequency (or velocity of the source or target), the product becomes $$X_a(\omega_j)X^*_b(\omega_j) = \left(\frac{A}{2}\right)^2 e^{i\omega_x \Delta t(\xi_a-\xi_b)} \left[\frac{\sin((\omega_x-\omega_j)N\Delta t)}{N\sin((\omega_x-\omega_j)\Delta t)}\right]^2 + \Psi_a(\omega_j)\Psi^*_b(\omega_j) \quad (19)$$

This leads to the definition of the second order estimator $$\hat{T}_{xx}(\omega_j,l) \equiv \frac{\Lambda_\kappa}{P_{xx}} \underbrace{\sum_{a=1}^{P}\sum_{b=1}^{P} X_a(\omega_j)X^*_b(\omega_j)}_{\text{constraints}} \quad (20)$$

subject to the constraints $$b > a \quad (21)$$

and $$a \neq b \quad (22)$$

where the lag, l, is defined as $$l \equiv a - b \quad (23)$$

and the number of averages for each lag is $$P_{xx} = P - l \quad (24)$$

The constraint that b must be greater than or equal to a avoids averaging of redundant products.

The expected value of the estimator given by equation (20) is $$E[\hat{T}_{xx}(\omega_j,l)] = \Lambda_\kappa e^{i\omega_x \Delta t Sl} \left(\frac{A}{2}\right)^2 \left[\frac{\sin((\omega_x-\omega_j)N\Delta t)}{N\sin((\omega_x-\omega_j)\Delta t)}\right]^2 \quad (25)$$

where biasing by Gaussian noise (including cross terms) is avoided by the further constraint of inequality (23) that a may not be equal to b. The number of averages, $P_{xx}$, varies in dependence on the lag, l.

In contrast to known spectrum analysis methods where correlated noise the estimation of delay or phase shift, this definition is easily extended to multiple channels, including cases where time delay or phase shift exists between to measurements, at differing locations, of the same signal or tonal. For example, $$E[\hat{T}_{xy}(\omega_j,l)] = \Lambda_\kappa e^{i(\omega_x \Delta t Sl+\phi_x-\phi_y)} \left(\frac{AB}{4}\right) \left[\frac{\sin((\omega_x-\omega_j)N\Delta t)}{N\sin((\omega_x-\omega_j)\Delta t)}\right]^2 \quad (26)$$

While it can be seen from Equation (26) that phase information is preserved by the use of HOS analysis in accordance with the invention, the ability to extract phase information is limited because the phase steps in multiples of $\omega_x \Delta tS$ which is generally greater than $2\pi$. Therefore, the phase information which can be directly extracted is ambiguous. However, the Fourier transform over data which is indexed by lag, l, could be used to extract the amplitude squared as long at the frequency of the signal of interest is substantially invariant over the observation time. Nevertheless, this is a significant restriction on the utility of a second order detector in accordance with the invention. The example, however, shows the potential for extracting information in a simple manner which is not available in known spectrum analysis techniques.

The limitation on frequency variation during the sampling period is avoided in the family of fourth-order detectors which will now be described. Following the above analysis, the fourth order product of samples and conjugates is $$X_a(\omega_j)X_b(\omega_j)X^*_c(\omega_j)X^*_d(\omega_j) = \left(\frac{A}{2}\right)^4 e^{i[\omega_x \Delta t(\xi_a+\xi_b-\xi_c-\xi_d)+\nu\Delta t^2(\xi_a^2+\xi_b^2-\xi_c^2-\xi_d^2)]}e^{i\nu\Delta t^2(\xi_a+\xi_b-\xi_c-\xi_d)(N-1)}$$

$$\frac{\sin(\Xi_{ja}N\Delta t)\sin(\Xi_{jb}N\Delta t)\sin(\Xi_{jc}N\Delta t)\sin(\Xi_{jd}N\Delta t)}{N\sin(\Xi_{ja}\Delta t)N\sin(\Xi_{jb}\Delta t)N\sin(\Xi_{jc}\Delta t)N\sin(\Xi_{jd}\Delta t)} + \Psi_a(\omega_j)\Psi_b(\omega_j)\Psi^*_c(\omega_j)\Psi^*_d(\omega_j) \quad (27)$$

where the cross terms, which will average to zero, have again been ignored to simplify the expression. The fourth-order estimator is then given by $$\hat{T}_{xxxx}(\omega_j,l) \equiv \frac{\Lambda_\kappa^2}{P_c} \underbrace{\sum_{a=1}^{P}\sum_{b=1}^{P}\sum_{c=1}^{P} X_a(\omega_j)X_b(\omega_j)X^*_c(\omega_j)X^*_d(\omega_j)}_{\text{constraints}} \quad (28)$$

subject to the constraint $$d = a + b - c \quad (29)$$

that makes the fourth-order estimator independent of frequency, and the constraints $$0 \leq a \leq P, a \leq b \leq P$$

$$0 \leq c \leq P, c \leq d \leq P$$

$$a^2 + b^2 > c^2 + d^2 \quad (30)$$

that avoid averaging of redundant products, and the further constraint $$a \neq c, b \neq c \quad (31)$$

that avoids biasing by Gaussian noise. The lag, l, is now defined as $$l \equiv \frac{1}{2}(a^2 + b^2 - c^2 - d^2) \quad (32)$$

and the number of averages for each lag, $P_c$, (the subscript indicating chirp) can be computed numerically. The mean or expected value of the fourth-order estimator is $$E[\hat{T}_{xxxx}(\omega_j,l)] = \Lambda_\kappa^2 e^{i2vs^2\Delta t^2 l} \left(\frac{A}{2}\right)^4 \frac{1}{P_c} \underbrace{\sum_{a=1}^{P} \sum_{b=1}^{P} \sum_{c=1}^{P} \frac{\sin(\Xi_{ja}N\Delta t)\sin(\Xi_{jb}N\Delta t)\sin(\Xi_{jc}N\Delta t)\sin(\Xi_{jd}N\Delta t)}{N\sin(\Xi_{ja}\Delta t)N\sin(\Xi_{jb}\Delta t)N\sin(\Xi_{jc}\Delta t)N\sin(\Xi_{jd}\Delta t)}}_{\text{constraints}} \quad (33)$$

subject to the same constraints, as will be demonstrated below.

It will be recognized by those skilled in the art, that the above constraints and definition of lag, l, correspond to equations (11), (13), (12) and (16) in the aforementioned U.S. Pat. No. 5,402,131 (Navy Case No 75,280) and the implementation is substantially identical to that described therein. Constant frequency of the tonal corresponds to the constant velocity case and chirp corresponds to the constant acceleration case described therein. The following development of a description of this family of detectors generally parallels the development in this copending application but is placed in a more generalized notation. However, reference is made to the above-incorporated application for further details.

When a constant frequency tonal is present in the jth bin, the expected value of the triple average taken over a specified region of values will have a real part that is proportional to the amplitude to the fourth power of the tonal. The expected value for those bins containing only noise is zero. Quantitatively, the expected value for a bin containing a tonal is $$E[\hat{T}_{xxxx}(\omega_j)] = \Lambda_\kappa^2 \left(\frac{A}{2}\right)^4 \left[\frac{\sin((\omega_x - \omega_j)N\Delta t)}{N\sin((\omega_x - \omega_j)\Delta t)}\right]^4 \quad (34)$$

and which is independent of lag, l. The non-zero part is real valued. For this case, the number of averages which are taken is $$P_c = -\frac{P}{12} - \frac{P^2}{8} + \frac{P^3}{12} \quad (35)$$

Normalizing the fourth-order average by the power spectrum squared gives a type of coherency function. This method of normalization has added meaning for the constant frequency (or constant velocity) case because the real part of the fourth-order average is related to the signal power squared and the power spectrum is related to signal power plus noise power. For the constant frequency case, the test statistic is the fourth-order average divided by the power spectrum squared at each frequency. Therefore the ratio of these values is less than unity when noise is present. To demonstrate this, let the signal power in a spectral bin containing a signal of interest be $$xx^* = \Lambda_\kappa \left(\frac{A}{2}\right)^2 \left[\frac{\sin((\omega_x - \omega_j)N\Delta t)}{N\sin((\omega_x - \omega_j)\Delta t)}\right]^2 \quad (36)$$

and let the noise power in the spectral bin be $$\sigma_\eta^2 = G_{\eta\eta}(\omega_j) \quad (37)$$

Therefore, the signal to noise ratio (SNR) is $$SNR = \frac{xx^*}{\sigma_\eta^2} \quad (38)$$

Then, for moderate to high SNR, $$E\left[\frac{\text{Real}[\hat{T}_{xxxx}(\omega_j)]}{\hat{G}_{xx}^2(\omega_j)}\right] \cong \frac{(xx^*)^2}{(xx^* + \sigma_\eta^2)^2} = \left(\frac{SNR}{SNR+1}\right)^2 \quad (39)$$

These results are easily extended to multiple channels where signal arrival angle introduces a time delay or phase shift between measurements of the same tonal at different locations in a sensor array. Three different averages are unique:

$$E[\hat{T}_{xxyx}(\omega_j)] = \Lambda_\kappa^2 e^{i(\phi_x - \phi_y)} \frac{A^3 B}{16} \left[\frac{\sin((\omega_x - \omega_j)N\Delta t)}{N\sin((\omega_x - \omega_j)\Delta t)}\right]^4 \quad (40)$$

or $$E[\hat{T}_{xxyy}(\omega_j)] = \Lambda_\kappa^2 e^{i2(\phi_x - \phi_y)} \frac{A^2 B^2}{16} \left[\frac{\sin((\omega_x - \omega_j)N\Delta t)}{N\sin((\omega_x - \omega_j)\Delta t)}\right]^4 \quad (41)$$

or $$E[\hat{T}_{xyxy}(\omega_j)] = \Lambda_\kappa^2 \frac{A^2 B^2}{16} \left[\frac{\sin((\omega_x - \omega_j)N\Delta t)}{N\sin((\omega_x - \omega_j)\Delta t)}\right]^4 \quad (42)$$

Thus it is seen that Equation (42) gives only an amplitude and differs from Equation (41) by omission of a factor containing only a phase difference term. If the amplitude terms A and B are equal, Equation (40) differs from Equation (41) by twice this phase difference. Therefore, averages over multiple pairs of sensor outputs can readily be used to double the effective aperture size when estimating the phase difference. Moreover, correlated noise does not bias the result as in known spectrum analysis techniques. Therefore, improved estimates of direction of signal arrival can be made and achieved more simply than by known spectrum analysis techniques. By including a lag term, as described in the above-incorporated U.S. Patent Application, similar results can be obtained even when the tonal is varying linearly in frequency.

The standard deviation of the fourth-order estimator normalized by signal plus noise power (power spectrum) squared is $$\frac{\sqrt{VAR[\hat{T}]}}{(xx^* + \sigma_\eta^2)^2} = \frac{\sqrt{A + B^*SNR + C^*SNR^2 + D^*SNR^3}}{P_c(1+SNR)^2} \quad (43)$$

where the coefficients A, B, C and D are $$A = -\frac{7}{12}P + \frac{P^2}{8} + \frac{P^3}{12} \quad (44)$$

$$B = -\frac{11}{6}P + \frac{P^2}{4} + \frac{P^3}{3} \quad (45)$$

$$C = -\frac{P}{3} - \frac{P^2}{3} - \frac{P^3}{6} + \frac{5}{24}P^4 \quad (46)$$

and $$D = \frac{P}{30} + \frac{P^2}{24} + \frac{P^3}{24} - \frac{13}{96}P^4 + \frac{P^5}{20} \quad (47)$$

Figure 3:
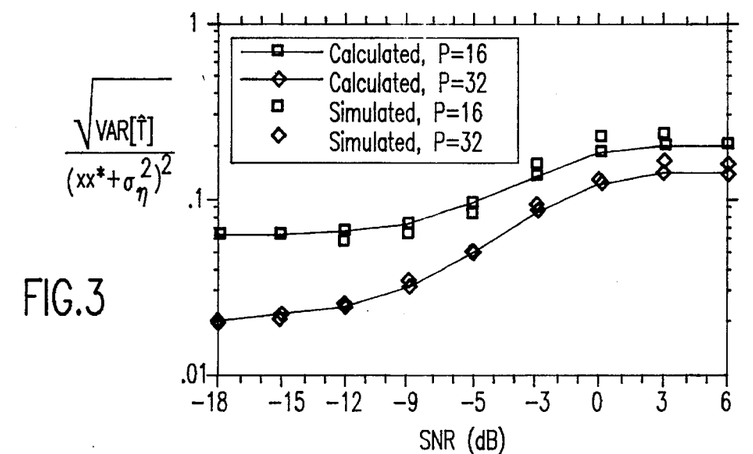
FIG. 3 is a graphical comparison of the results of a simulation performance and calculated standard deviation of the fourth-order estimator in accordance with the invention, FIGS. 4A and 4B provide a graphical comparison of the power spectrum squared, as detected by known spectrum analysis techniques and the performance of the present invention.

It is readily seen from FIG. 3 that the results of a simulation agree very well with this calculated value derived from equation (28).

Figure 4A:
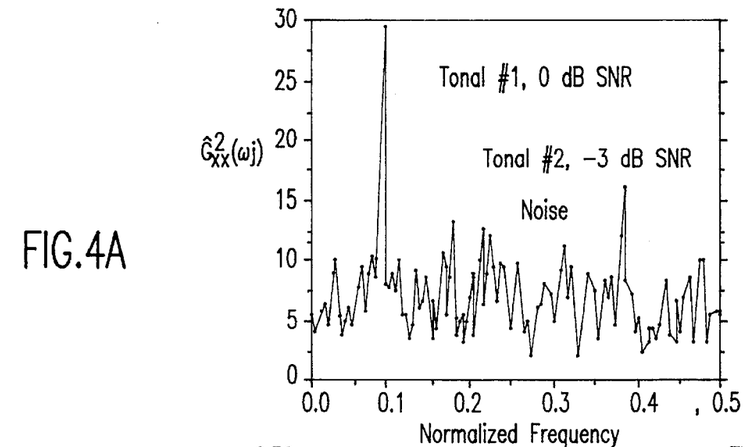
Figure 4B:
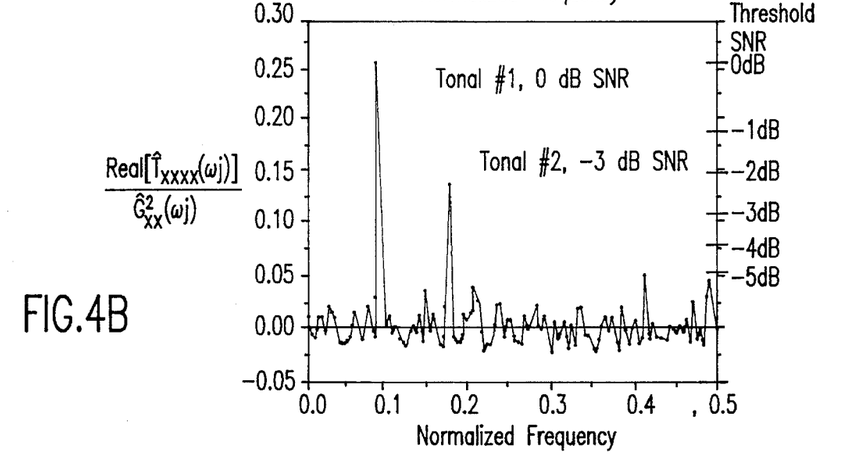

As further indication of the potential efficacy of the invention, the computed power spectrum squared as would be produced by conventional spectrum analysis techniques is shown in FIG. 4A and the spectrum detected by a fourth-order HOS detector in accordance with the invention is shown in FIG. 4B. Both of these Figures show a large peak representing tonal #1 which is present at a 0.0 dB SNR. FIG. 4B clearly shows tonal #2 which is present at −3 dB SNR far above any other peaks which represent noise. This result is in sharp contrast with tonal #2 in FIG. 4A which remains buried in noise and undifferentiated therefrom.

Figure 5:
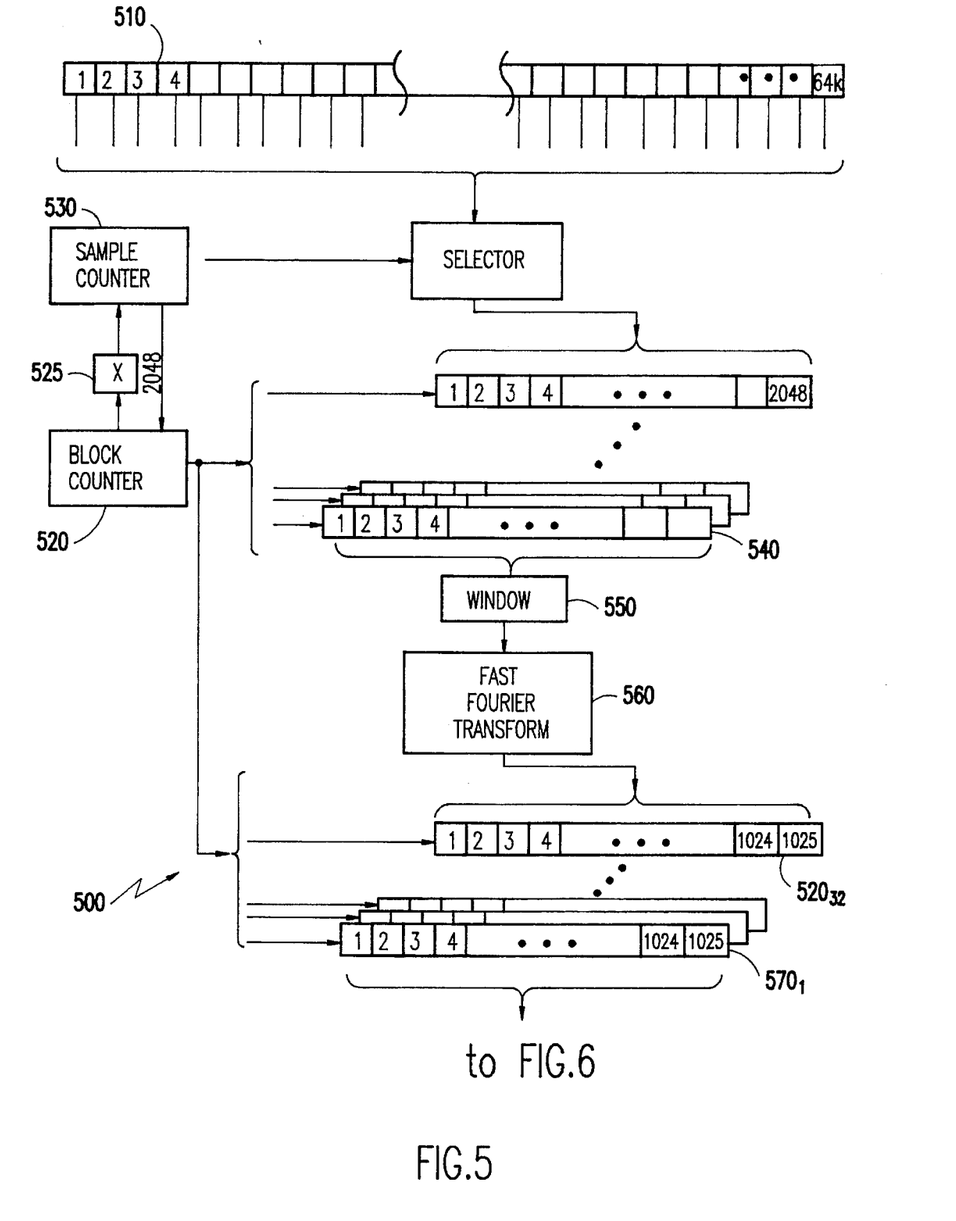
FIG. 5 is a schematic block diagram of a signal preprocessor in accordance with the invention.
Figure 6:
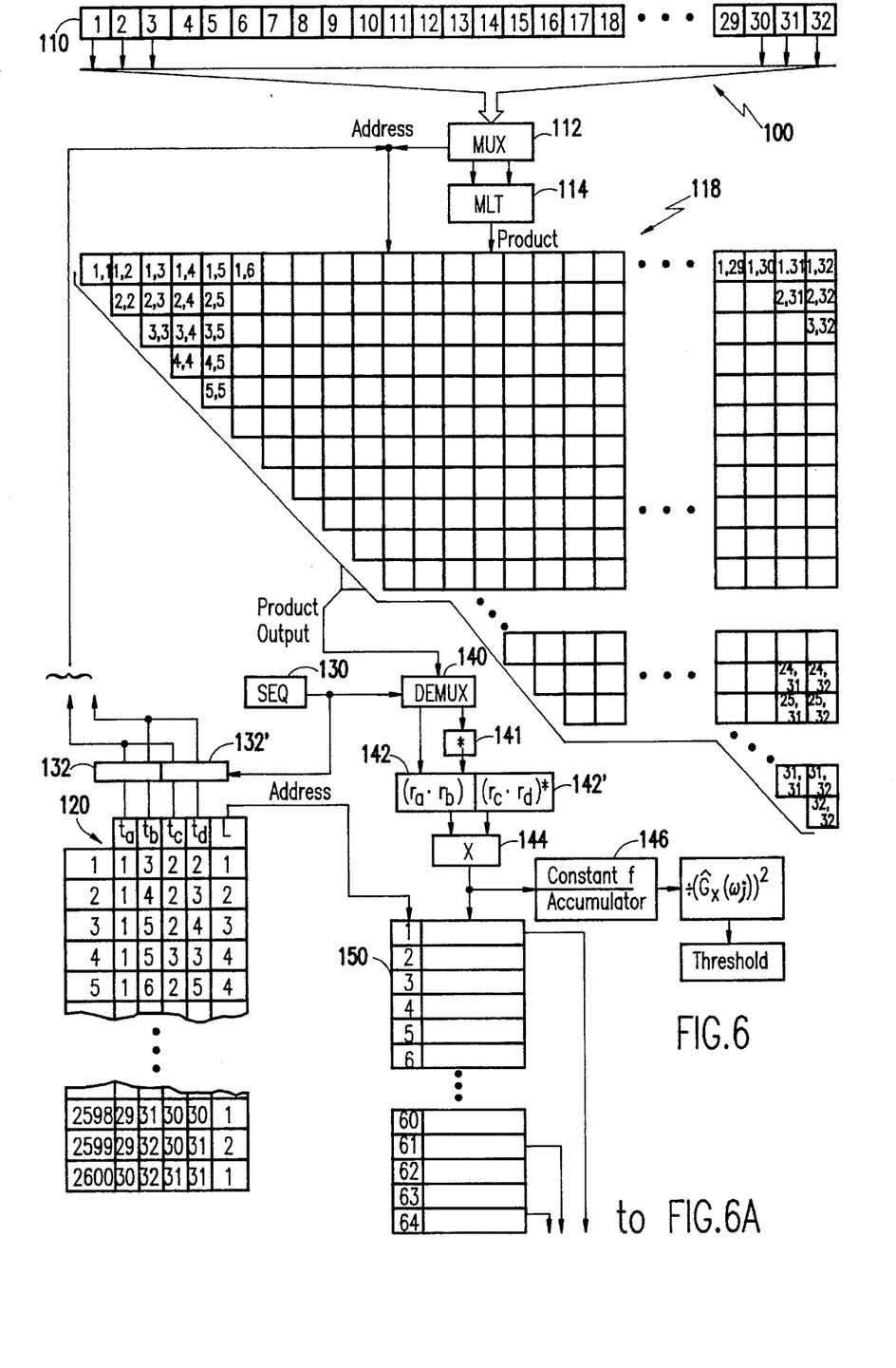
FIGS. 6, 6A and 7 show further details of fourth-order signal processing in accordance with the invention for a fourth-order detector, FIG. $6_1$ shows an arrangement for sixth-order detection processing in accordance with the invention, and FIGS. 8, 9, 10 and 11 compare the performance of the invention with that of known spectrum analysis techniques.
Figure 7:
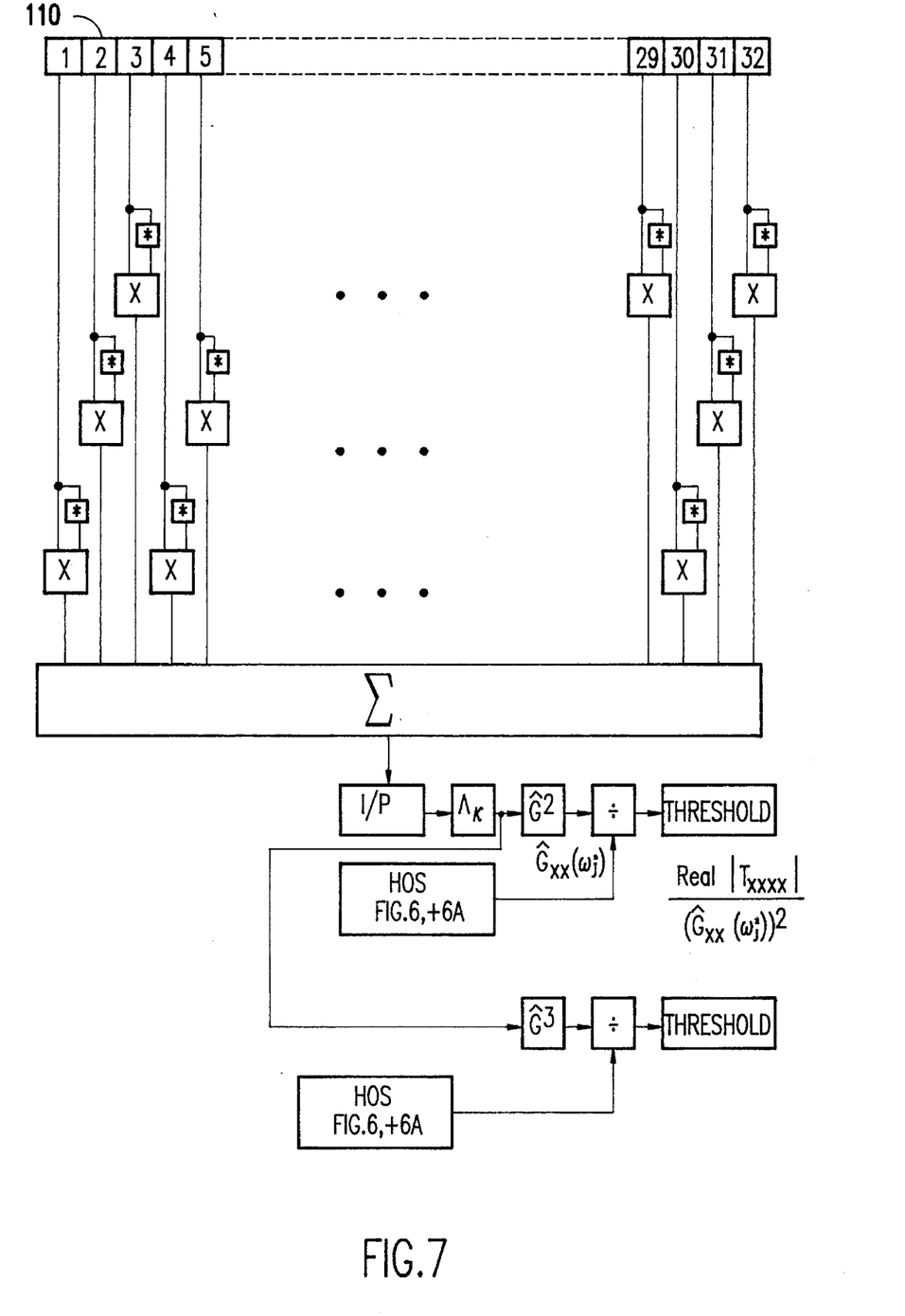

To implement a fourth-order signal power detector in accordance with the invention, reference is now made to FIGS. 5–7. A preprocessor 500 is shown in FIG. 5 which is used to convert the time sampled data into a plurality of overlapping blocks of data, perform a fast Fourier transform on each block and store the output of the FFT for each block. Specifically, a time-history containing a signal of interest and noise is sampled at a large number of time instants depending on the desired spectral resolution and the amount of overlap as indicated in Equation (2), above. In the preferred embodiment of the invention and to limit the sampling period, 2048 samples are provided in each of 32 blocks. The amount of overlap is somewhat arbitrary and can be adjusted to allow for the available data. Overlaps greater than 50% are generally regarded in the art to give no significant advantage in comparison to processing time required. Therefore, for the preferred embodiment of preprocessor 500, register 510 will require not more than 65,536 (e.g. 64K) digitized samples at the desired accuracy or resolution (e.g. number of significant bits).

It should be understood in regard to FIGS. 5–7 that while a special purpose processor could be provided and may provide some performance enhancement, it is presently preferred to emulate the functional elements shown in FIGS. 5, 6, 6A and 7 with a suitably programmed general purpose processor, preferably including a math coprocessor in view of the ease of doing so, as is well understood in the art, and the flexibility for modification provided thereby. In this regard, it should be noted that certain types of noise, such as sea clutter (e.g., Doppler processing) are only approximated by Gaussian noise functions and there is much debate among those skilled in the art concerning processing enhancements, some of which will be discussed below, which will allow rejection of a portion of the small amount of noise remaining. Therefore, the flexibility for adding or removing some processing steps afforded by the utilization of a general purpose processor is preferred.

The samples in register 510 are broken into blocks by two interconnected counters 520 and 530. Block counter 520 counts the number of blocks which have been generated at any given time, providing a number to multiplier 525 which multiplies the number of the previous block by the number of samples in the block less the number of samples of overlap and supplies the result as an initial count to sample counter 530. From this initial count, sample counter 530 is incremented a number of times equal to the number (e.g. 2048) samples which will comprise each block. When this number of counts is reached by sample counter 530, an output is provided to block counter 520 causing the block count to be incremented and a new initial count to be provided to sample counter 530. By repeating the process in this way, blocks of sample data are built up in registers 540.

As each of these registers 540 is filled, the contents are provided to a fast Fourier transform processor 560. The individual data samples may be weighted, if desired, to impose a window on the data as schematically indicated at 550, prior to performance of the fast Fourier transform operation. The results of this operation are separated by frequency in accordance with this operation and the results stored in one of registers $570_1$–$570_{32}$, under control of the block counter 520. It should be understood that a section across corresponding bins of registers $570_1$–$570_{32}$ corresponds to register 110 of FIG. 6 and register 110 need not be separately provided. It should also be noted that if the signal in register 510 is derived from an active detection system or otherwise should contain complex values (e.g. I and Q samples from a pulse Doppler radar system) each of registers $570_1$–$570_{32}$ would be twice as long since the Fourier transform of complex data signals does not necessarily have conjugate symmetry around zero frequency, as will be understood by those skilled in the art.

Referring now to FIG. 6, the major storage elements of implementation 100 as shown in FIGS. 6 and 7 include a sample register 110, a data sample look-up table 118 and an index look-up table (LUT) 120. Data storage space is set aside in high-speed Random Access Memory (RAM) accessible by the processor during initialization. Then, index look-up table 120 is created.

It is considered important to the preferred implementation of the invention to create the index LUT 120 in such a way as to eliminate all data which does not meet the constraints of Equations (29)–(32), above. Specifically, for P= 32 complex data in a block, this reduces the amount of data stored and the consequent number of computations of averages from 32,768 to 2600, in accordance with equation (35). Additionally, it is both hardware efficient and computationally efficient to compute and store lag indices, l, during creation of the index LUT. Therefore, even though for a constant P, the addresses provided into the data sample LUT and lag indices for various combinations of samples would always be the same, the possibility of change of P and the size of the index LUT's which would result make it preferable to create the index LUT anew each time the processing in accordance with the invention is performed in view of the simplicity of doing so in combination with computation of l for each address.

Specifically, the index LUT is preferably created by four nested loops with exit conditions for a, b or c being equal to P and branching conditions which discard combinations of a, b and c which do not meet the conditions specified in equations (29), (30) and (31), above. The preferred procedure for creating the index LUT requires only a relatively few FORTRAN™ commands and may be expressed as follows, wherein npts=P:

npas=0

Main loop - loop over all combinations (states) of ja, jb, jc and jd that will be tested.

do 20 ja=1,npts

Restrict jb to be equal to or greater than ja to remove redundancy in accordance with equation (30).

do 20 jb=ja, npts do 20 jc=1, npts

Restrict jd to be equal to or greater than jc to remove redundancy in accordance with equation (30).

do 20 jd=jc,npts

Then apply equation (29) to remove combinations of ja, jb, jc and jd which do not satisfy it. Of course, jd could be computed directly from ja, jb and jc. Then discard combinations of samples which would cause sensitivity of the average by source frequency.

jta=ja+jb–jc–jd if(jta.eq.0) go to 30 go to 40

30 continue

Then, combinations are excluded which would cause biasing of the average by Gaussian noise as given by Equation (31).

if (ja.eq.jc) go to 40 if (jb.eq.jc) go to 40

Then, the lag is calculated, as follows, in accordance with equation (32) and is restricted to greater than or equal to 0 in accordance with the last condition of equations (30) to remove redundant states.

$$jtb=ja2+jb2-jcs-jd2$$

if(jtb.lt.0) go to 40

Then l is computed (as jtb2) using jtb, above, and a maximum is iteratively found.

$$jtb2=jtb/2$$

if(jtb2.gt.imax) imax=jtb2

The index LUT 120 is completed by storage as an address to the index LUT (npas) varies from 1 to 2600.

npas=npas+1 jja(npas)=ja jjb(npas)=jb jjc(npas)=jc jjd(npas)=jd jab(npas)=jtb2

The process is exited when looping is completed to ensure that the index LUT will not exceed required limits and the number of possible states which satisfy all conditions of equations (29), (30) and (31) are counted and stored to the index LUT. The number of states which produce the same l are also counted and stored for future use in constant change of frequency with time (e.g. constant chirp or constant acceleration) processing. The return loop commands allowing discarding of combinations is:

40 continue and the main loop return is provided by:

20 continue
        return
        end At this point, the index LUT 120 will be complete to provide access to the data sample LUT 118. A block of P (=32) data samples of the complex values of the returned signals can now be input to the data sample register 110 (FIG. 6). Then, all allowed combinations of the data samples are selected by multiplexer 112 and multiplied by multiplier 114 and the products placed in the data sample look-up table 118 in accordance with pairs of addresses ranging from 1 to P.

To compute the averages, a sequencer 130, which effectively functions as a clock which is synchronized to the processing, provides a logical 0 or 1 to dual selector 132, 132' such that, at any instant, one pair of values of a and b or c and d will be provided to the data sample look-up table. Of course, two such tables could be provided to allow a single access of each. However, it is considered more efficient to provide only a single table from which a single product is retrieved at a time since the data sample LUT is large and stored data would be redundant (unless the conjugates of the products are pre-computed for storage in a second table). However, since some products will not be used, it is more efficient to compute the conjugate later and only for those products actually retrieved.

The accessed product is provided to a demultiplexer 140 which is also driven by sequencer 130 and thus synchronized with dual selector 132, 132'. If selector 132 provides addresses to the data sample LUT, the retrieved product is directly stored to register 142. If selector 132' provides addresses to the data sample LUT, the conjugate of the product is computed at 141 and the result stored to register 142'. The values in registers 142 and 142' are then multiplied by multiplier 144 and the result accumulated.

In order to accommodate processing for both constant frequency and constant change of frequency with time (e.g. constant chirp), it is preferable to accumulate the result of multiplication in two different ways simultaneously. For the constant frequency case where lags are, by definition, the same, accumulation at accumulator 146 is without regard to lag, l. At the conclusion of the process, the real part of the accumulated result is divided by 2600 and normalized by the power spectrum squared as the HOS average for the constant frequency case. For the constant chirp (or constant source or target acceleration) case, accumulation is done by lags with the calculated value of l, stored in the index LUT and divided by the number of values accumulated for each value of l for each set of data to be retrieved, in sequence, with l used as an address in accumulator array 150 in which the accumulation is to be done.

Figure 6A:
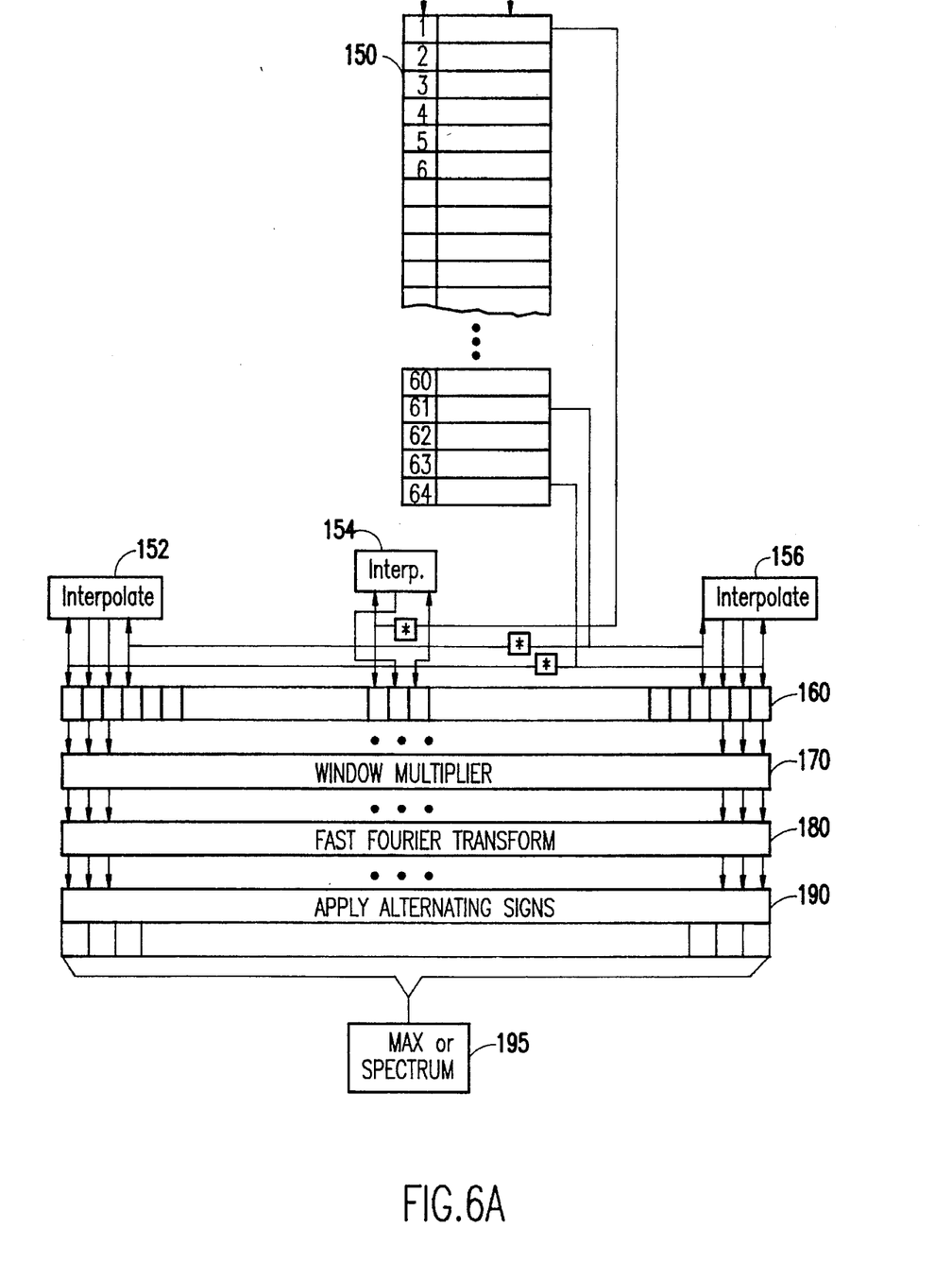

Referring now to FIG. 6A in which accumulator array 150 is repeated for reference, the accumulated values corresponding to values of l from 1 to 64 are mapped into a register 160. Each value is directly mapped into a stage of register 160 from 65–128 and the conjugate is computed and stored in a mirror-symmetrical location in stages 1 to 64. As pointed out above, there will be no accumulated value for a lag of zero or for certain other values of l, such as 62 and 63. These values are supplied by interpolation by interpolators 152, 154 and 156. Any interpolation technique is suitable for this purpose, and the details of the interpolation function performed are unimportant to the practice of the invention.

Then, if desired (e.g. to de-emphasize the values toward the ends of the register), each value can be multiplied by a value to impose a window on the data in register 160 by multiplier window 170. It should be noted that the application of a window of a particular shape is common practice in the art to remove side lobes and improve resolution. In the invention, at the present time, a rectangular data window is used to achieve a slight improvement in performance. However, a cosine window can be used on the theory that the density of interpolated values (for which there is no l produced by a combination of a, b, and c) will increase near the ends of register 160. The cosine window results in a slight loss of performance over a constant weighting (e.g. rectangular window) but has value when resolving the chirp between detected targets. That is, a rectangular window should be preferable for detection and a tapered window such as a cosine window should be preferable for resolving a plurality of sources or targets within the same frequency bin.

The symmetrical mapping of values and conjugates into register 160, as shown, causes an artifact to be developed by performance of a fast Fourier transform 180 which can be eliminated after the sign of each value is inverted at 190 after the fast Fourier transform is performed at 180. The results then correspond to chirps or accelerations, sorted into "bins" from which a maximum real part can be selected or the real parts of the values in the "bins", normalized by the power spectrum squared, displayed as a chirp or acceleration spectrum at 195. The display of a spectrum is preferred, as discussed above, particularly where plural sources/targets having different chirps/accelerations may be present in the same frequency bin.

Then to complete the process, the result of either the constant frequency case and/or the constant chirp case which has been divided by the power spectrum squared and then compared to a threshold, as shown in FIG. 7, to determine whether detection has occurred. In practice, the threshold is empirically adjusted (e.g., manually), or in accordance with predicted performance as will be discussed with reference to FIG. 8, until the false alarm rate falls to an acceptable level such as $10^{-3}$. However, noise which may be encountered in practical use of the invention may be variable or modulated by some natural mechanism as a function of frequency. It has been found by the inventor that some dynamic adjustment of the test statistic prior to thresholding is particularly advantageous in combination with the present invention to provide additional sensitivity and reliability of detection. Utilization of such dynamic adjustment is assumed in the foregoing discussion. This dynamic adjustment is referred to as constant false alarm rate (CFAR). However, CFAR is considered to be a perfecting feature of the invention and is not necessary to the practice thereof. CFAR will now be discussed with reference to FIG. 7.

As explained in the above-incorporated U.S. Patent Application, if each value in the sample input register 110 is multiplied by its conjugate and the results summed and then divided by the number of samples, P (=32), an estimate of the power spectrum of the "signal-plus-noise" (or noise variance over a bandwidth associated with a bin if a target is not present) of the data samples (or more properly, an estimate of the signal power (if any) plus noise variance) can be derived at each frequency bin. In summary, the power spectrum squared at a frequency bin has been divided by the HOS estimator to derive a ratio that is used as the test statistic value. This will adjust the test statistic to a fixed threshold such that the dynamic variations in the noise statistic maintain the false alarm rate to quite closely track a constant value, on average.

Figure 8:
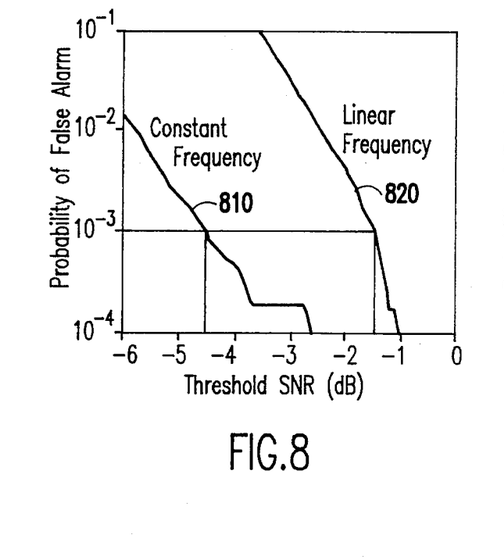

Since operation of the detector in accordance with the invention at a substantially constant false alarm rate is thus made possible, it is preferable to establish detection thresholds graphically from the predicted false alarm rate as shown in FIG. 8. FIG. 8 shows the predicted false alarm rates of both the constant frequency (810) and the linearly varying (constant chirp) frequency (820) cases, discussed above, derived from simulations. If the desired sensitivity is to be a false alarm rate of one false alarm per thousand tries, then the threshold is determined by constructing a line horizontally at a false alarm rate of $10^{-3}$ which yields the SNR thresholds of −4.5 dB for the constant frequency (or velocity) case and −1.5 dB for the linearly varying frequency (constant acceleration or chirp) case. If the threshold comparator of FIG. 7 is set to provide a positive indication when the actual SNR exceeds one of these values (e.g. −4.5 dB, a high degree of certainty of detection is implied by a positive output of the threshold comparator, as shown in FIG. 9.

Figure 9:
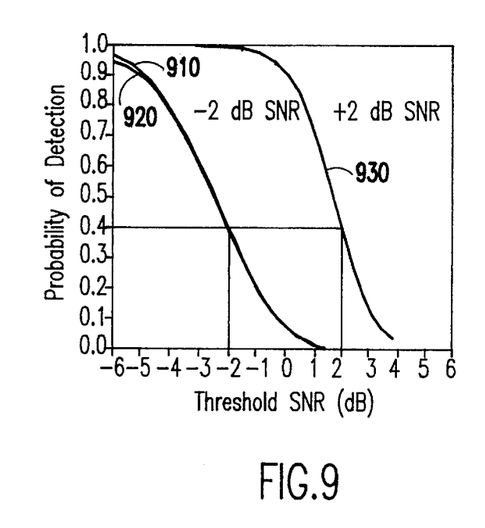
Figure 10:
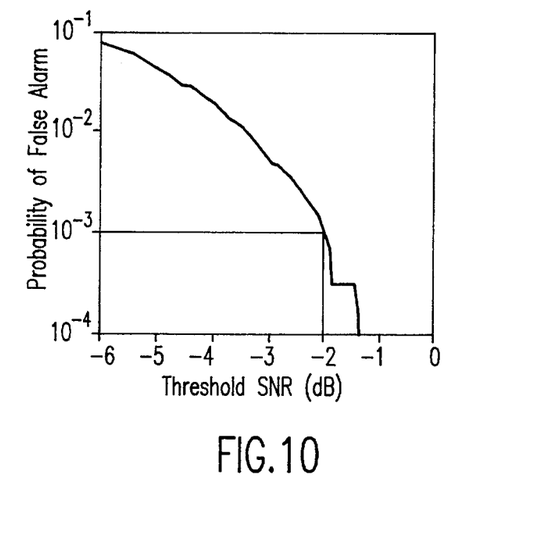
Figure 11:
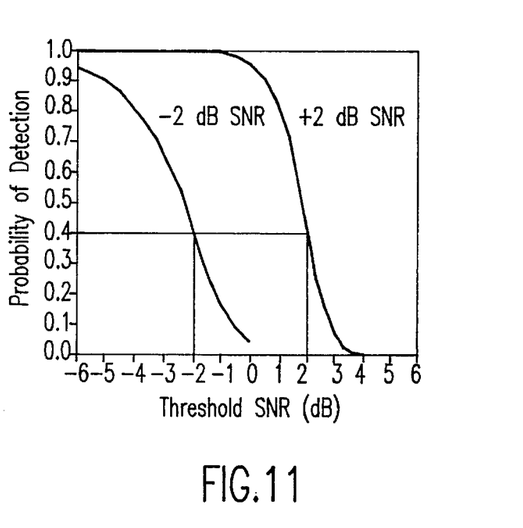

In comparison to the power spectrum or quadratic detector of FIG. 10, at a $10^{-3}$ false alarm rate, it is seen that the invention has similar performance to a quadratic detector for the linearly varying frequency case. However, it must be recalled that this level of performance of the quadratic detector requires knowledge of the characteristics of the noise whereas the invention delivers a comparable level of signal detection performance without requiring such knowledge. Therefore, the invention provides a capability heretofore unavailable in signal power detectors at very slight cost in performance (about 7% probability of detection at the SNR of the set threshold, as shown in FIGS. 9 and 11). Further, the invention is able to characterize the nature of the chirp and quantify the rate of change of frequency of the detected signal by virtue of processing of data indexed by lags in the same manner that chirp or acceleration could be quantified in the above-incorporated U.S. Patent Application.

The invention is also capable of applying a consistent methodology to a wide variety of signal characteristics and variations thereof by the simple expedient of altering the spectral resolution (e.g. by adjustment of the sampling period and/or the FFT size corresponding to the number of samples included in a block of samples) which will alter the frequencies allocated to each bin when the FFT is performed as shown in FIG. 5. For example, the sampling rate and block size can be adjusted to keep the frequency variation to less than two bins, as indicated by Equations (1), (5) and (6). Overlap is not critical and has been found to be optimally about 50% and can be adjusted somewhat to fit the available data without significant loss of performance. That is, while reduction of overlap corresponds to discarding of data performance losses are negligible for most overlap adjustments which may be required. Overlap adjustment is readily accomplished by changing the number by which the block number is multiplied at 525 of FIG. 5. By the same token, and approximately 50% overlap will allow a 64K sample memory to accommodate 32 blocks of 4096 samples, each, corresponding to a practical upper limit on the spectral resolution which may be required since increased spectral resolution limits the amount of frequency variation over time which will permit detection.

To demonstrate the efficacy of the present invention, FIGS. 8 and 9 shows the receiver operating characteristics of a fourth order detector in accordance with the invention for both constant and linearly varying frequency. In FIG. 9, these characteristics are approximately the same, as indicated by only slight variation at 910 and 920, for a substantial variation of SNR. In other words, for a SNR threshold (the horizontal axis of FIG. 9 which also is the same scale as the threshold SNR in dB indicated at the right side of FIG. 4B) set to the actual SNR (represented by the curves 910, 920 and 930 of FIG. 9), the probability that detection being made by the invention is only slightly less than 40%. If a constant frequency were to be detected and the threshold set in accordance with a −4.5 dB SNR as shown in FIG. 8 to correspond to a $10^{-3}$ false alarm rate, a signal having a −2 dB SNR would be detected about 85% of the time. Similarly, by interpolation, a signal having a 0 dB SNR would be detected in virtually every instance.

The performance of a sixth-order detector in accordance with the invention is similar to that indicated above for the fourth-order detector. However, the definition and preferred implementation will be illustrative of variations of the invention which are deemed to fall within the scope thereof. Essentially, some loss of potential performance is unavoidable as the order of the detector is increased since the number of constraints to avoid redundancy and biasing of the processing result by Gaussian noise reduces the number of products which can be averaged. On the other hand, this reduces storage requirements and provides some simplification of the processing required, particularly if a special purpose processor is provided. Higher order processing can also provide additional information concerning frequency variation over time and can also allow extension of the methodology to numbers of channels greater than two.

Specifically, consider the sixth-order product $$X_a(\omega_j)X_b(\omega_j)X_c(\omega_j)X^*_d(\omega_j)X^*_e(\omega_j)X^*_f(\omega_j) = \qquad (48)$$

$$\left(\frac{A}{2}\right)^6 e^{i[\omega_x\Delta t(\xi_a+\xi_b+\xi_c-\xi_d-\xi_e-\xi_f)+v\Delta t^2(\xi_a^2+\xi_b^2+\xi_c^2-\xi_d^2-\xi_e^2-\xi_f^2)]}e^{iv\Delta t^2(\xi_a+\xi_b+\xi_c-\xi_d-\xi_e-\xi_f)(N-1)} \cdot$$

$$\frac{\sin(\Xi_{ja}N\Delta t)\sin(\Xi_{jb}N\Delta t)\sin(\Xi_{jc}N\Delta t)\sin(\Xi_{jd}N\Delta t)\sin(\Xi_{je}N\Delta t)\sin(\Xi_{jf}N\Delta t)}{N\sin(\Xi_{ja}\Delta t)N\sin(\Xi_{jb}\Delta t)N\sin(\Xi_{jc}\Delta t)N\sin(\Xi_{jd}\Delta t)N\sin(\Xi_{je}\Delta t)N\sin(\Xi_{jf}\Delta t)} +$$

$$\Psi_a(\omega_j)\Psi_b(\omega_j)\Psi_c(\omega_j)\Psi^*_d(\omega_j)\Psi^*_e(\omega_j)\Psi^*_f(\omega_j)$$

where the cross terms between the sinusoid and noise are omitted for the same reasons as in the fourth-order embodiment. This leads to the definition of the sixth-order estimator as $$\hat{T}_{xxxxx}(\omega_j) \equiv \frac{\Lambda_\kappa^3}{P_s} \underbrace{\sum_{a=1}^{P}\sum_{b=1}^{P}\sum_{c=1}^{P}\sum_{d=1}^{P}\sum_{e=1}^{P} X_a(\omega_j)X_b(\omega_j)X_c(\omega_j)X^*_d(\omega_j)X^*_e(\omega_j)X^*_f(\omega_j)}_{\text{constraints}}$$

subject to the constraint that makes the sixth-order estimator independent of frequency $$f=a+b+c-d-e \qquad (50)$$

and the constraint that makes the sixth-order estimator independent of linear frequency sweep $$a^2+b^2+c^2=d^2+e^2+f^2 \qquad (51)$$

and the constraint that avoids the averaging of redundant products $$0 \leq a \leq P, a \leq b \leq P, b \leq c \leq P$$

$$0 \leq d \leq P, d \leq e \leq P, e \leq f \leq P$$

$$a^3+b^3+c^3 \geq d^3+e^3+f^3 \qquad (52)$$

and the constraint that avoids biasing by Gaussian noise $$a \neq d, b \neq d, c \neq d \qquad (53)$$

If an accelerating frequency is now allowed, then a lag, l, would be defined as $$l \equiv -\frac{1}{12}(a^3+b^3+c^3-d^3-e^3-f^3) \qquad (54)$$

The number of averages $P_s$, is computed numerically and for P=32, $P_s$=1166. By comparison, it will be recalled that $P_c$ was 2600 in the constant frequency case of the fourth-order detector. The expected value of this estimator is subject to the above constraints. It can be appreciated that this estimator, allows simultaneous consideration of a larger number of combinations of sensor outputs and sensor array geometries from which phase information could be extracted and, for example, can be analyzed to provide quantification of numerous types of motion of the source of the signal of interest. Analysis of up to six channels are possible with a sixth-order detector.

A practical implementation of a sixth-order detector is shown in FIG. $6_1$. This implementation differs from the fourth-order embodiment shown in FIG. 6 by the omission of storage of precomputed products of pairs of data. The reduced number of products which must be computed after constraints are applied is reduced to levels at which the preferred computation arrangement of FIG. 6 does not engender an equal degree of comparative convenience.

More specifically, look up table 120' now provides six addresses in register 110 (which is effectively the same structure as a bin from each one of registers 570 of FIG. 5) to selector 112' to provide six values to register 143. The conjugates of the latter three of these values is computed at conjugate calculators 141'. These values are then multiplied at multiplier 144' and the results simultaneously accumulated for constant frequency detection at 146' and the individual results accumulated in accordance with particular values of lag, l, in lag table 150'. These accumulated values may then be indexed by lag and further processed by the arrangement of FIG. 6A precisely as for the fourth-order embodiment of the invention.

These methods and practical implementations thereof may be readily extended to higher order averages for sinusoids that have phase terms containing higher order polynomials. For example, in an eighth-order embodiment, constant frequency in the fourth-order embodiment would correspond to a first order polynomial in phase; a linear chirp to a second order polynomial in phase, and so on for higher order embodiments. These techniques can thus be used to decompose polynomial phase signals to determine the coefficients of these polynomials. However, as the order of the detector increases, a higher SNR is expected to be required to correctly estimate the coefficients.

It should be appreciated from the foregoing that during each data segment, the frequency of the signal of interest can $$E[\hat{T}_{xxxxx}(\omega_j)] = \Lambda_\kappa^3 \left(\frac{A}{2}\right)^6 \frac{1}{P_s} \underbrace{\sum_{a=1}^{P}\sum_{b=1}^{P}\sum_{c=1}^{P}\sum_{d=1}^{P}\sum_{e=1}^{P} \prod_{\xi=a}^{e} \frac{\sin(\Xi_{j\xi}N\Delta t)}{N\sin(\Xi_{j\xi}\Delta t)}}_{\text{constraints}}$$

vary up to two bin widths without significant distortion of its FFT. Such distortion will take the form of a frequency shifts for frequency variations of less than two bin widths but will have little effect on the shape of the spectrum. However, as the transform at each bin is averaged in accordance with the invention, the signal of interest will have spent only part of the time in or near that bin. Therefore, it is likely that a higher SNR will be required for isolating a signal of interest where the frequency change is wide or rapid since a wider processing bandwidth is required to contain the variation. The invention also provides for this possibility by allowing control of the sample data into blocks or segments at multiplier 525 and counter 530. For example, the sample run could be divided into two separate runs and each processed at half the spectral resolution by reducing the size of the FFT (e.g., to 512 samples). The results from each run can then be coherently averaged or displayed as a function of time. If this is not sufficient to capture the frequency variation, the sample run could be divided into four parts and the spectral resolution divided by four and so on. However, it must be recognized that reducing the spectral resolution increases the bandwidth of each frequency bin and increases the noise power. Therefore, it is anticipated that an increased SNR may be necessary for frequency variations of greater size or rate. Nevertheless, the reduction of Gaussian noise provided by the selection of values for calculating the averages provides detection capability of unknown signals by a consistent methodology which was not heretofore available.

In view of the foregoing, it can be seen that the invention provides a signal detector of improved performance and sensitivity at low signal to noise ratios and capable of rapid signal analysis for detection, even when the signal varies in frequency over time. The invention is capable of detecting signals about which nothing is known in advance of the analysis and results in the production of substantial information about the signal which can be used to advantage in other signal analysis techniques, including classical spectrum analysis by allowing the portion of the spectrum containing the signal of interest to be isolated for detailed analysis. Therefore, in view of the simple and consistent methodology of the invention and implementations thereof, it is anticipated that the invention will provide features, when included in signal analyzers of currently known types, which will enhance user interaction therewith as well as adding the capability of detecting and tracking an unknown signal. For example, user specified limitation of the portion of the spectrum to be analyzed is often provided in commercially available spectrum analyzers. If the present invention is combined therewith in a single instrument or test arrangement, this feature could be used to limit processing in accordance with the invention to frequency bins of interest to increase speed of detection. The detector in accordance with the invention is completely applicable to any periodic signal, including radar and sonar signals which may be transmitted and reflected from objects as well as passive detection of signals, regardless of source or origin, including condition-based diagnostics of machinery and passive tracking of the motion of signal sources with hydrophones and the like.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a method for detection of a signal in a noisy environment including computation of a test statistic from a list of combinations of values in blocks of signals sampled from said noisy environment, the steps of: dividing a run of the sampled signals into said blocks, performing a fast Fourier transform on each of said blocks, sorting results of said fast Fourier transform by frequency, eliminating combinations of said results which are redundant, excluding from said list combinations of the results derived from the sampled signals in which noise is present, and determining said detection of the signal based on the test statistic computed only from the combinations of said results remaining after said steps of eliminating and excluding the combinations of the results which are redundant and/or in which the noise is present.

2. A method as recited in claim 1 wherein said sampled signals are returned to a receiver by reflection.

3. A method as recited in claim 1, including the further step of obtaining said run of the sampled signals by dividing a longer run of the sampled signals.

4. A method as recited in claim 3, including the further step of reducing spectral resolution of said fast Fourier transform.

5. The method as defined in claim 1 wherein the signal detected is propagated from an unknown source through a medium within which said noisy environment is established.

6. The method as defined in claim 5 wherein said medium is water.

7. In a signal detection method including computation of test statistics from combinations of values in blocks of signals which remain after combinations which are redundant are eliminated and combinations of signals in which noise is present are excluded, the improvement residing in: sampling signals propagated from targets to be detected through a noisy environment to include information on frequency behavior of the signals characterizing said targets; sorting the blocks of the sampled signals according to frequency thereof; and limiting said computation of the test statistics to the frequency sorted blocks of the sampled signals from which the information on the frequency behavior of the signals propagated from the targets is extracted.

8. The method as defined in claim 7 wherein said noisy environment is seawater within which the targets are located, and said step of sampling the signals is performed within a seagoing vessel.

9. The method as defined in claim 7 including the further step of performing a fast Fourier transform on said blocks of the sampled signals before said step of sorting.

10. The method as defined in claim 9 wherein said noisy environment is seawater within which the targets are located.

11. The method as defined in claim 10 wherein the signals propagated through the seawater are acoustic sounds.

12. The method as defined in claim 11 wherein said step of sampling the signals is performed within a seagoing vessel.

* * * * *